Aug. 23, 1932.                    C. B. WARD                    1,873,690
                            CAN OR PAIL HAND TRUCK
                            Filed July 6, 1931              2 Sheets-Sheet 1
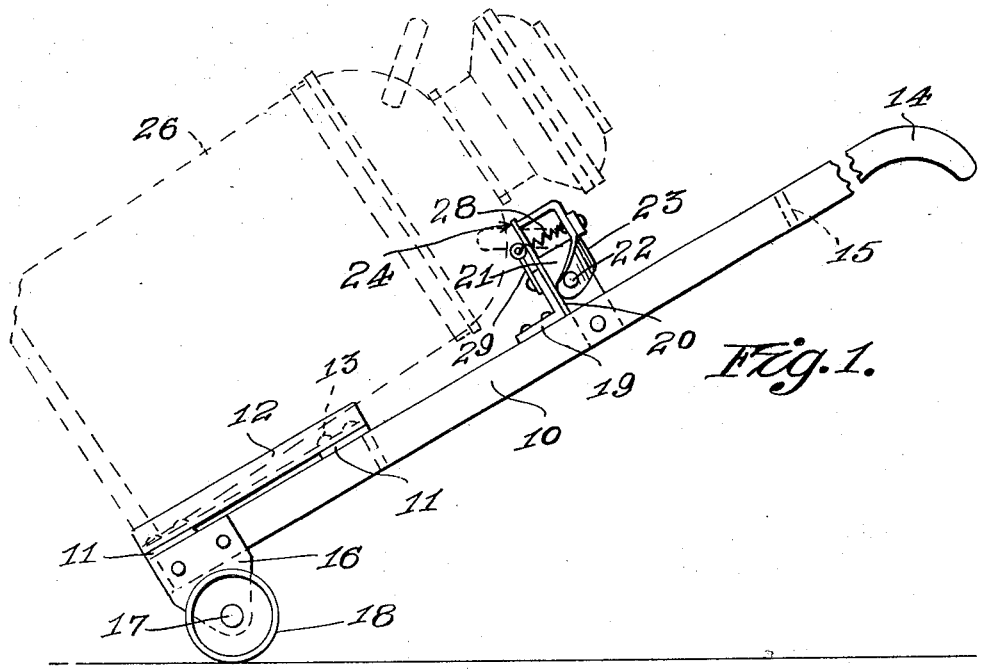
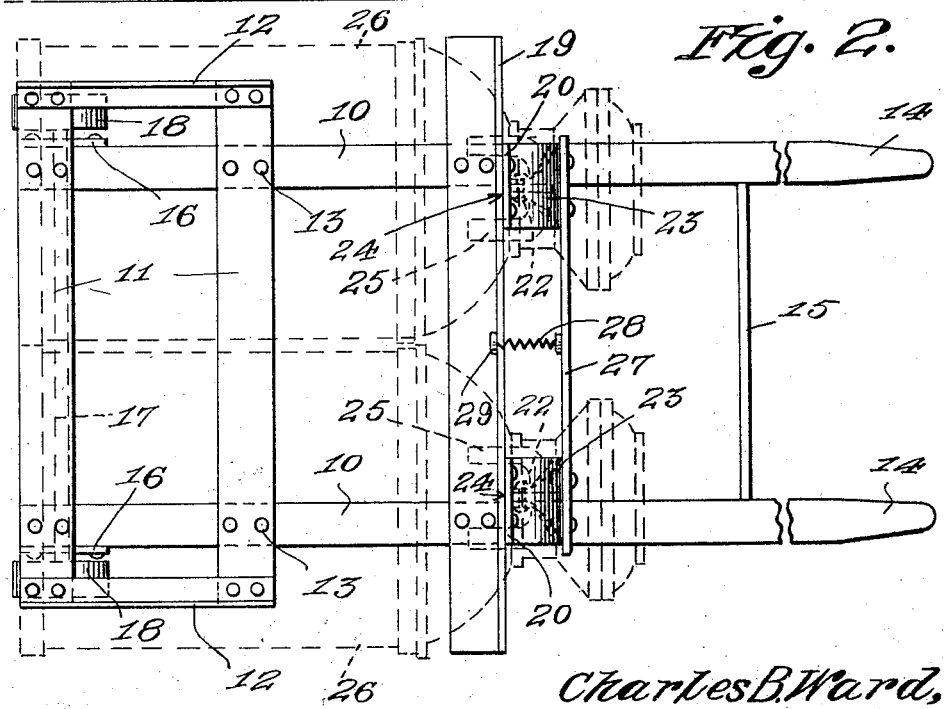

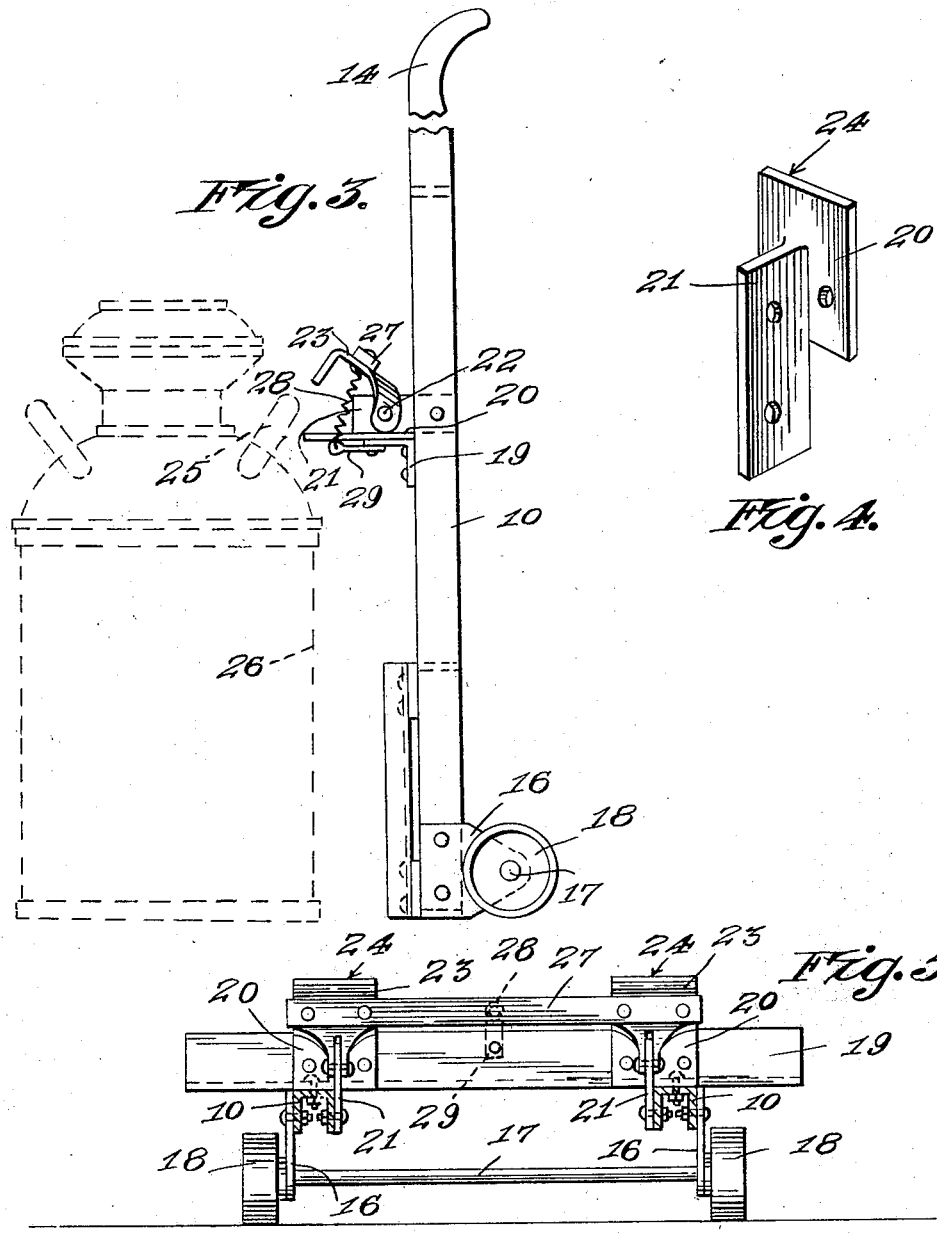

Patented Aug. 23, 1932

1,873,690

UNITED STATES PATENT OFFICE

CHARLES B. WARD, OF DETROIT, MICHIGAN

CAN OR PAIL HAND TRUCK

Application filed July 6, 1931. Serial No. 549,049.

The invention relates to a can or pail hand truck.

The primary object of the invention is the provision of a truck of this character whereby in one or several cream or milk cans or pails can be automatically raised thereon and transported from one point to another without liability of the falling of either or both of the cans or pails from the truck during transportation.

Another object of the invention is the provision of a truck of this character, wherein the construction thereof enables the handling of one or several cans or pails without requiring the manual lifting of such cans or pails for the loading thereof upon the truck and the discharge or delivery of such cans or pails therefrom and when loaded onto the truck will be secure so that the same can be transported from one place to another by the truck.

A further object of the invention is the provision of a truck of this character, wherein the manner of engaging and loading a can or pail or several thereof upon the truck is novel in form and conveniently operated so as to permit easy transportation and also the delivery from the truck.

A still further object of the invention is the provision of a truck of this character which is extremely simple in construction, thoroughly reliable and efficient in its purpose, strong, durable and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a side elevation of a truck showing by dotted lines a can or pail held thereon and in position for transportation.

Figure 2 is a top plan view showing by dotted lines several cans or pails mounted upon the truck.

Figure 3 is a side elevation showing the truck in position to attach a can or pail, the latter being shown by dotted lines ready to be received and lifted by the truck.

Figure 4 is a perspective view of one of the bearings used on the truck.

Figure 5 is a vertical transverse sectional view through the truck, taken on the line 5—5 of Figure 3.

Similar reference characters indicate corresponding parts throughout the several views in the drawings.

Referring to the drawings in detail, 10 designates the longitudinal or side stringers of the frame of a wheeled truck of ordinary type and 11 the transverse pieces of a can or pail rack including the end abutments 12, these pieces being bolted or otherwise fastened to the stringers as at 13 and are arranged in spaced parallel relation at one end of said truck, the other ends of the stringers being formed with handles 14 as usual. The handle end of the frame carries a cross brace 15 made fast in the stringers in any suitable manner.

At the rack end of the frame are axle hangers 16 in which is mounted the axle 17 carrying the wheels 18 for the truck, thus rendering the truck mobile which is manually pushed or pulled for transportation purposes.

Spaced from the rack and intermediate the ends of the frame is arranged a transversely disposed angle bar 19, the latter being made fast to the stringers 10 in any suitable manner, the fasteners being of a character to permit adjustment of the bar 19 longitudinally of the frame. Mounted on this bar 19 are bearings 20 to the lugs 21 of which are pivoted at 22 latches 23, which lugs are elongated and fastened to the stringers 10, the latches 23 being of hook type, while on said bar in alignment with the latches 23 are keepers 24 to engage with a handle 25 on a cream or milk can, pail or the like 26 so as to permit the lifting of the same from a foundation when in the position as shown in Figure 3 of the drawings with the truck related thereto onto the latter as shown in Figures 1 and 2 of the drawings. The latches 23 are adapted to close against the keepers 24 when the handle of a can or pail is engaged therewith.

Secured to the latches is a cross rail 27 which permits such latches to be moved in unison with each other and with this rail 27 intermediate thereof is connected a coiled retractile spring 28, the same being also anchored at 29 to the bar 19, the spring being designed to automatically pull the latches 23 closed onto the keepers 24. The rail 27 constitutes a hand grip for a user of the truck to lift the latches 23 for the opening thereof when it is required to lift and load a can or pail or cans or pails onto the truck as shown in Figures 1 and 2 of the drawings. The cans or pails when upon the truck will be held in the rack constituted by the pieces 11 and abutments 12, there being no possibility of such cans or pails accidentally rolling from the truck during transportation thereby.

It will be clearly obvious that it is unnecessary to manually lift or manipulate the cans or pails as the truck can be rolled into position as shown in Figure 3 of the drawings and by slightly tilting forwardly thereon the keeper 24 will engage with the handle 25, it being understood of course that the latch 23 is lifted and when released will latch the handle on the can or pail and in this manner the latter be fastened for the lifting thereof by the truck onto a truck and also the transportation of such can or pail.

What is claimed is:—

In a two-wheeled hand truck, a frame having a can or pail rack at its lower portion, an angle cross bar on the frame spaced from the rack and adjustably secured to said frame, bearings carried by and projected from the cross bar for engagement through the handles of cans or pails when upon the rack and having lugs upstanding and secured to the frame, hook-like latches pivoted to the lugs to embrace said handles and rest upon the bearings, a rod uniting the latches, and a tensioning spring active upon the rod to hold the latches in engaging position in unison with each other.

In testimony whereof I affix my signature.

CHARLES B. WARD.